(12) United States Patent
Jang et al.

(10) Patent No.: US 8,467,146 B2
(45) Date of Patent: Jun. 18, 2013

(54) APPARATUS FOR CLAMPING DISK AND MOTOR ASSEMBLY HAVING THE SAME

(75) Inventors: Ho Kyung Jang, Gyunggi-do (KR); Jae Jun Kim, Gyunggi-do (KR); Bum Cho Kim, Seoul (KR); Il Oung Park, Seoul (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 20 days.

(21) Appl. No.: 13/137,449

(22) Filed: Aug. 16, 2011

(65) Prior Publication Data

US 2012/0050913 A1 Mar. 1, 2012

(30) Foreign Application Priority Data

Aug. 30, 2010 (KR) .................. 10-2010-0083953

(51) Int. Cl.
*G11B 17/00* (2006.01)
(52) U.S. Cl.
USPC ....................................... 360/99.12
(58) Field of Classification Search
USPC .......... 360/99.12, 99.08, 97.13, 98.08, 99.04, 360/97.11, 99.09, 99.18
See application file for complete search history.

(56) References Cited

U.S. PATENT DOCUMENTS

| | | | | |
|---|---|---|---|---|
| 5,555,233 A * | 9/1996 | Yano et al. | ..................... | 720/709 |
| 5,633,856 A * | 5/1997 | Mukawa | ...................... | 720/712 |
| 6,205,111 B1 * | 3/2001 | Hayakawa | ................... | 720/707 |
| 6,417,988 B1 * | 7/2002 | Renken et al. | ............ | 360/99.12 |
| 6,757,132 B1 * | 6/2004 | Watson et al. | ............ | 360/99.12 |
| 7,027,261 B2 * | 4/2006 | Momoi | ...................... | 360/98.08 |
| 7,093,346 B2 * | 8/2006 | Kim et al. | .................. | 29/603.03 |
| 7,158,343 B2 * | 1/2007 | Kim | ......................... | 360/99.12 |
| 8,077,432 B2 * | 12/2011 | Hanlon et al. | ............ | 360/99.08 |
| 8,199,428 B2 * | 6/2012 | Araki et al. | ................ | 360/99.12 |
| 8,248,726 B2 * | 8/2012 | Nakazawa et al. | ......... | 360/99.12 |
| 2005/0052782 A1 * | 3/2005 | Kim et al. | .................. | 360/99.12 |
| 2005/0099723 A1 * | 5/2005 | Momoi | ..................... | 360/99.12 |
| 2006/0103975 A1 | 5/2006 | Tokumiya et al. | | |
| 2006/0274447 A1 * | 12/2006 | Kim et al. | .................. | 360/97.02 |
| 2007/0058292 A1 * | 3/2007 | Choi et al. | ................. | 360/99.12 |

FOREIGN PATENT DOCUMENTS

| | | |
|---|---|---|
| JP | 2007-267503 | 10/2007 |
| KR | 10-2005-0025902 | 3/2005 |
| KR | 10-2006-0045529 | 5/2006 |
| KR | 10-2007-0029457 | 3/2007 |

* cited by examiner

*Primary Examiner* — Allen T Cao

(57) ABSTRACT

There are provided an apparatus for clamping a disk and a motor assembly having the same. The apparatus for clamping a disk according to the present invention includes an apparatus for clamping a disk, including: a rotor case jointed with an outer peripheral surface of a shaft and rotating together with the shaft; a flange part including a disk mounting surface formed at a radial outer side of the rotor case and formed to be inclined as the disk mounting surface is toward the radial outer side; and a clamping member pressing and clamping the disk to the rotor case, wherein an inclination of the disk mounting surface of the flange part is changed depending on the position of the pressing point to the disk of the clamping member.

11 Claims, 4 Drawing Sheets y=14.655x+9.3272 y=13.789x-0.4577

APPARATUS FOR CLAMPING DISK AND MOTOR ASSEMBLY HAVING THE SAME

CROSS-REFERENCE TO RELATED APPLICATIONS

This application claims the priority of Korean Patent Application No. 10-2010-0083953 filed Aug. 30, 2010, in the Korean Intellectual Property Office, the disclosure of which is incorporated herein by reference.

BACKGROUND OF THE INVENTION

1. Field of the Invention

The present invention relates to an apparatus for clamping a disk and a motor assembly having the same.

2. Description of the Related Art

Recently, there is a need to increase the precision of components configuring an HDD with the general increase in capacity of hard disk drives (HDDs). In particular, it is important to keep a flying height of a head constant along a stroke path of an actuator between inner and outer data regions on a surface of a disk from a head slider of an HDD.

However, warpage of the disk may occur due to pressure applied to a surface mounted with a disk by a member for clamping a disk or a self-weight of a disk, at the time of assembling the disk, thereby increasing the flying height.

The increase in flying height degrades the rotation precision of the HDD, thereby causing degradation in the performance of the HDD, such as degrading the recording and reproducing precision of the disk, or the like.

SUMMARY OF THE INVENTION

An aspect of the present invention provides an apparatus for clamping a disk and a motor assembly having the same, capable of minimizing warpage of a disk to improve rotation precision at the time of mounting a disk.

According to another aspect of the present invention, there is provided an apparatus for clamping a disk, including: a rotor case jointed with an outer peripheral surface of a shaft and rotating together with the shaft; a flange part including a disk mounting surface formed at a radial outer side of the rotor case and formed to be inclined as the disk mounting surface is toward the radial outer side; and a clamping member pressing and clamping the disk to the rotor case, wherein an inclination of the disk mounting surface of the flange part is changed depending on the position of the pressing point to the disk of the clamping member.

The disk mounting surface of the flange part may be formed to be inclined upwardly in an axial direction when the pressing point is outward of the radial center of the flange part and is formed to be inclined downwardly in the axial direction when the pressing point is inward of the radial center of the flange part.

The inclination angle θ of the disk mounting surface of the flange part from the horizontal surface may be 0<θ≦0.0015 (rad) when the pressing point to the disk of the clamping member is outward of the radial center of the flange part, and the inclination angle θ may be −0.0015≦θ<0 (rad) when the pressing point is inward of the radial center of the flange part.

The inclination angle θ of the disk mounting surface may be 0<|θ|≦0.0006 (rad) when the pressing point is the radial center of the flange part.

The disk mounting surface of the flange part may be formed to be inclined so that the warpage of the disk is in the range of ±10 μm when the disk mounting surface is seated with the disk.

According to another aspect of the present invention, there is provided an apparatus for clamping a disk, including: a rotor case jointed with an outer peripheral surface of a shaft and rotating together with the shaft; a flange part including a disk mounting surface formed at a radial outer side of the rotor case and formed to be inclined as the disk mounting surface is toward the radial outer side; and a clamping member pressing and clamping the disk to the rotor case, wherein an inclination angle θ of the disk mounting surface of the flange part from a horizontal surface is formed in the range of 0<|θ|≦0.0015 (rad), depending on the position of the pressing point to the disk of the clamping member.

The inclination angle θ of the disk mounting surface may be 0<θ≦0.0015 (rad) when the pressing point to the disk of the clamping member is outward of the radial center of the flange part and the inclination angle θ may be −0.00150≧θ<0 (rad) when the pressing point is inward of the radial center of the flange part.

The inclination angle θ of the disk mounting surface may be 0<|θ|≦0.0006 (rad) when the pressing point is the radial center of the flange part.

According to another aspect of the present invention, there is provided a motor assembly, including: a rotor including a rotor case jointed with an outer peripheral surface of a shaft and rotating together with the shaft, a flange part including a disk mounting surface formed at a radial outer side of the rotor case and formed to be inclined as the disk mounting surface is toward the radial outer side, and a magnet mounted on the inner side of the rotor case; a bearing member rotatably supporting the shaft; a stator jointed with the outer peripheral surface of the bearing member and including a core wound with a winding coil generating a rotation driving force by electromagnetic interaction with the magnet; and a clamping member pressing and clamping the disk to the rotor case, wherein the inclination angle θ of the disk mounting surface of the flange part from the horizontal surface is formed in the range of 0<|θ|≦0.0015 (rad), depending on the position of the pressing point to the disk of the clamping member.

The inclination angle θ of the disk mounting surface is the inclination angle of the disk mounting surface in the apparatus for clamping a disk according the exemplary embodiment and another exemplary embodiment of the present invention.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
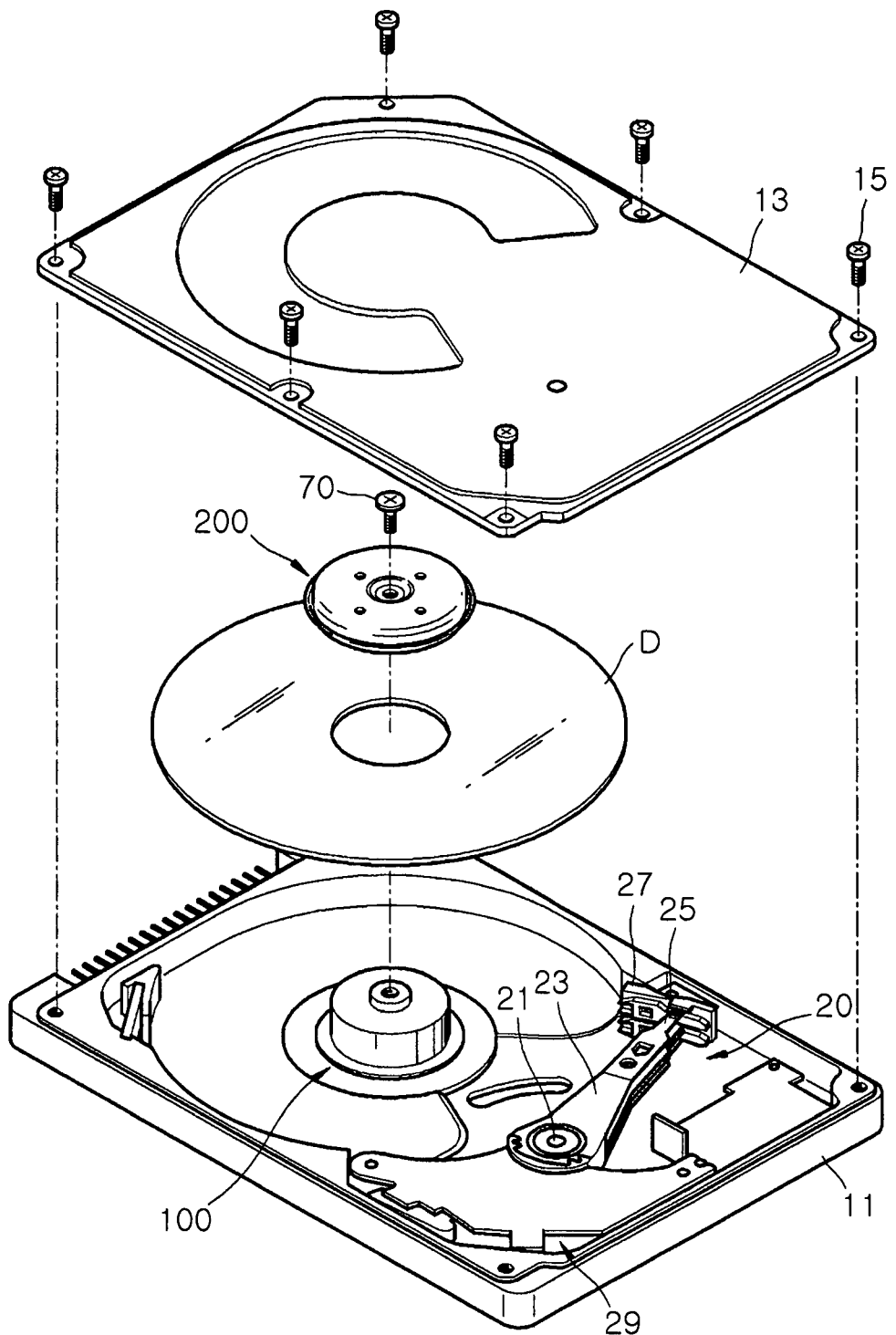
FIG. 1 is an exploded perspective view of a hard disk drive including a motor assembly according to an exemplary embodiment of the present invention.

Exemplary embodiments of the present invention will now be described in detail with reference to the accompanying drawings. However, it should be noted that the spirit of the present invention is not limited to the embodiments set forth herein and those skilled in the art and understanding the present invention can easily accomplish retrogressive inventions or other embodiments included in the spirit of the present invention by the addition, modification, and removal of components within the same spirit, and those are to be construed as being included in the spirit of the present invention.

Further, throughout the drawings, the same or similar reference numerals will be used to designate the same components or like components having the same functions in the scope of the similar idea.

Figure 2:
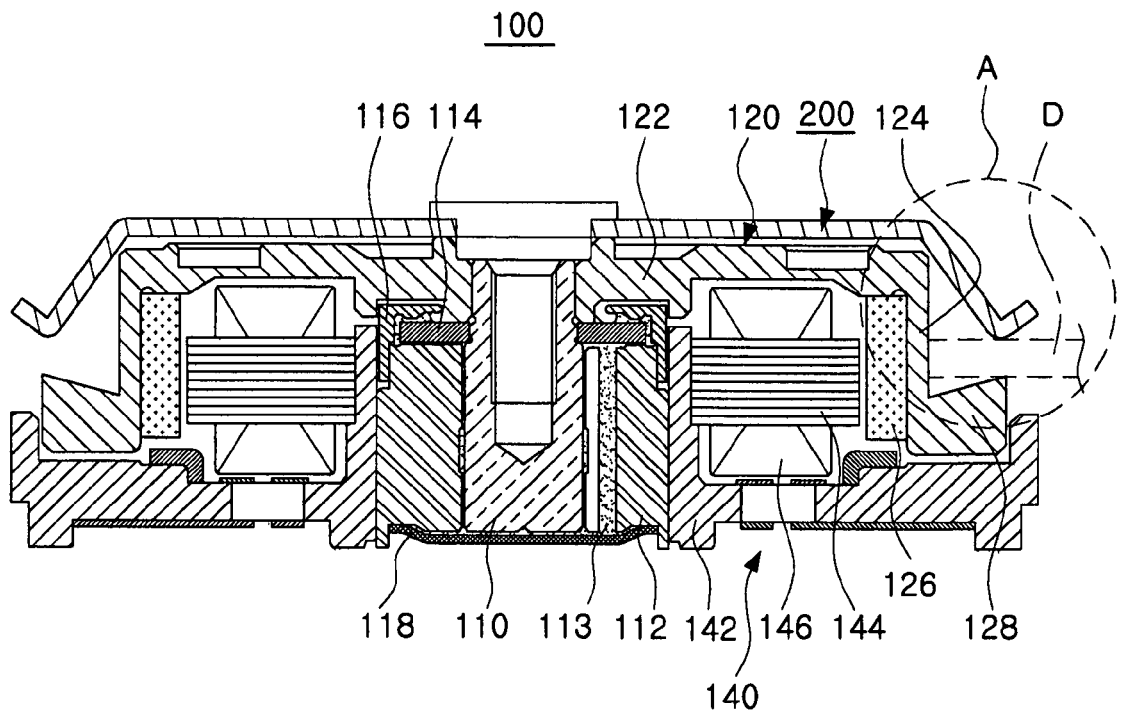
FIG. 2 is an axial vertical cross-sectional view of the motor assembly according to the exemplary embodiment of the present invention.
Figure 3:
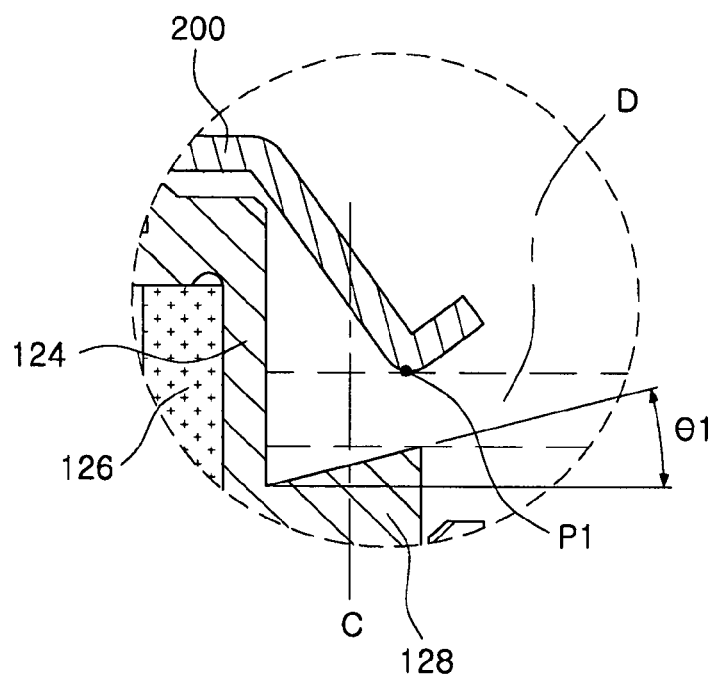
FIG. 3 is an enlarged view of part A of FIG. 2.
Figure 4:
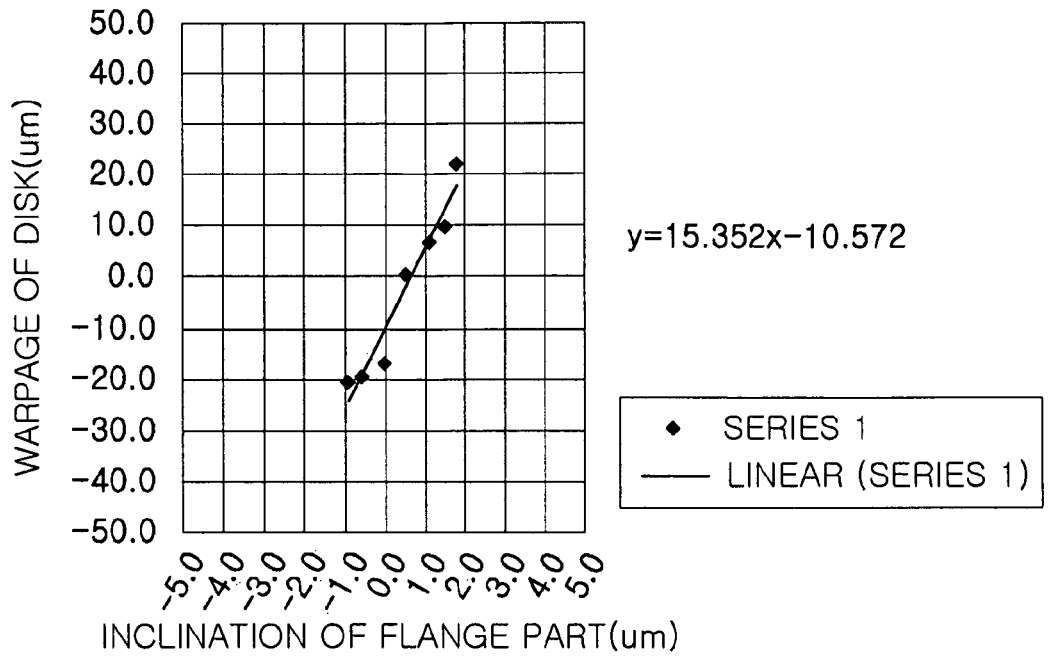
FIG. 4 is a graph measuring the warpage of a disk due to an inclination of a flange part in an apparatus for clamping a disk according to the exemplary embodiment of the present invention.

FIG. 1 is an exploded perspective view of a hard disk drive including a motor assembly according to an exemplary embodiment of the present invention, FIG. 2 is an axial vertical cross-sectional view of the motor assembly, FIG. 3 is an enlarged view of part A of FIG. 2, and FIG. 4 is a graph measuring warpage of a disk due to an inclination of a flange part in an apparatus for clamping a disk.

Referring to FIG. 1, the hard disk drive according to the exemplary embodiment of the present invention may include a base frame 11, a cover member 13, a spindle motor assembly having a data storage medium, i.e., at least one disk D, and an actuator 20.

The base frame 11 may be generally made of aluminum or an aluminum alloy and may be manufactured by die-casting. The upper side of the base frame 11 is provided with a space for receiving the spindle motor assembly, the actuator 20, or the like.

The cover member 13 is assembled on the upper surface of the base frame 11 by a screw 15, or the like, which serves to enclose and protect the disk D, a spindle motor 100, the actuator 20, or the like, and to prevent dust or humidity from being introduced into the disk drive and to block noise generated from the inside of the disk drive from being transferred to the outside.

The actuator 20 pivotally driven in a clockwise or counterclockwise direction on the disk D rotated together with the spindle motor 100 accesses a targeted track of the disk D while substantially moving along the radial direction of the disk D, thereby recording data on the disk D or reading the recorded data.

The actuator 20 includes a swing arm 23, a suspension 25, and a voice coil motor 29. The swing arm 23 is rotatably jointed with a pivot 21 mounted on a base frame 11. The suspension 25 is jointed with an end of the swing arm 23 to support a slider mounted with the head to be elastically biased to the surface of the disk D.

A voice coil motor 29 provides a driving force to rotate the swing arm 23 and is controlled by a servo control system. The voice coil motor 29 rotates the swing arm 23 in a direction depending on Fleming's left hand rule by the interaction between current input to the voice coil and a magnetic field generated from a magnet.

That is, if the disk D starts to rotate when a power supply for the disk drive is turned-on, the voice coil motor 29 rotates the swing arm 23 counterclockwise to move the head onto the recording surface of the disk D. On the contrary, if the rotation of the disk D stops when the power supply for the disk drive is turned-off, the voice coil motor 29 rotates the swing arm 23 clockwise to remove the head from the recording surface of the disk D. In this case, the head removed from the recording surface of the disk D is parked in a lamp 27 mounted on the outer side of the disk D.

The spindle motor assembly includes the spindle motor 100, the disk D, and a clamping member 200. The spindle motor 100 is used to rotate the disk D and is mounted on the base frame 11.

Referring to FIG. 2, the spindle motor 100 may include a fluid dynamic bearing assembly forming fluid dynamic pressure disposed in the shaft 110 fixedly mounted on the base frame 11, a stator 140 mounted on the outer peripheral side of the fluid dynamic bearing assembly, and a rotor 120 mounted an the outer side of the stator 140. The disk D is inserted onto the outer peripheral portion of the rotor 120.

Meanwhile, terms relating to directions will be defined. An axial direction means a vertical direction based on the a shaft 110 when viewed in FIG. 2, while a radial direction means an outer diameter direction of the rotor 120 based on the shaft 100 or the central direction of the shaft 110 based on the outer diameter edge of the rotor 120.

The fluid dynamic bearing assembly may include the shaft 110, a sleeve 112, a thrust plate 114, a cap member 116, and a cover plate 118.

The shaft 110 is inserted into a hollow portion formed at the central portion of the sleeve 112, the thrust plate 114 is axially disposed on the upper portion of the sleeve 112, the cap member 116 is disposed to cover the outer peripheral portions of the sleeve 112 and the thrust plate 114, and the cover plate 118 is axially disposed on the lower portions of the shaft 110 and the sleeve 112.

In this configuration, a micro clearance between the outer peripheral surface of the shaft 110 and the inner peripheral surface of the sleeve 112 is filled with oil as a lubricating fluid, allowing for the smooth rotation of the rotation member, including the shaft 110 and the rotor 120, with the dynamic pressure generated by a spiral type or herringbone type radial dynamic pressure groove formed on at least one of the outer peripheral surface of the shaft 110 and the inner peripheral surface of the sleeve 112.

A micro clearance between the lower surface of the thrust plate 114 and the upper surface of the sleeve 112 is filled with oil as the lubricating fluid, allowing for the smooth rotation the thrust plate 114 preventing the flying of the shaft 110 with the dynamic pressure generated by a spiral-type or herringbone-type thrust dynamic pressure groove formed on at least one of the lower surface of the thrust plate 114 and the upper surface of the sleeve 112.

The cap member 116 is made of an elastic material and is axially mounted to be clamped on the outer peripheral surface of the upper portion of the sleeve 112 and may be provided with a sealing part taper-sealing oil between the cap member 116 and the upper surface of the thrust plate 114. Oil is pumped into the fluid dynamic bearing assembly side with the dynamic pressure generated by the dynamic pressure groove formed on at least one of the upper surface of the thrust plate 114 and the lower surface of the cap member 116, thereby making it possible to form a meniscus at the sealing part.

The upper portion and lower portion of the sleeve 112 are axially formed to communicate with each other and may be formed with a bypass path 113 for dispersing the pressure of oil.

The cover plate 118 is made of an elastic material to be elastically deformed when axially jointing with the lower portion of the sleeve 112 and covers the lower portion of the sleeve 112 to support the sleeve 112 and the shaft 110. The outer peripheral surface of the cover plate 118 may be jointed with the inner peripheral surface of the sleeve 112 and the clearance between the cover plate 118 and the sleeve 112 are filled with oil, such that the cover plate 118 may serve as the bearing supporting the lower surface of the shaft 110.

The rotor 120 is a rotating structure that is jointed with the shaft 110 and is rotatably provided with respect to the stator 140, together with the shaft 110. The rotor 120 may include a rotor case and the magnet 126 mounted at the inner side of the rotor case.

The rotor case may include a hub base 122 clamped by being pressed-fit into the upper end of the shaft 110, a magnet support part 124 extending in an outer-diameter direction from the hub base 122 and axially curved downwardly to support the magnet 126, and a flange part 128 extending from the lower portion of the magnet support part 124 to the radial outer side and having a disk mounting surface formed on the upper portion thereof.

The magnet 126 is a permanent magnet generating a magnetic force having a predetermined strength by alternately magnetizing an N pole and an S pole thereof in a circumferential direction. The rotor 120 is rotated by the electromagnetic interaction between the coil 146 and the magnet 126.

The stator 140 is a clamping structure that includes a winding coil 146 generating an electromagnetic force having a predetermined magnitude at the time of applying power and a plurality of cores 144 to which the winding coil 146 is wound.

The core 144 is fixedly disposed on the upper portion of the base 142 on which a printed circuit board (not shown) printed with a circuit pattern is provided and a plurality of coil holes having a predetermined size may penetrate through the upper surface of the base 142 corresponding to the winding coil 146 in order to expose the winding coil 146 downwardly, wherein the winding coil 146 is electrically connected to the printed circuit board in order to supply external power thereto.

The clamping member 200 is screw-connected with the upper portion of the rotor case by a screw member 70. The clamping member 200 may include an opening part formed at the center thereof so that the screw member 70 is inserted thereinto and a pressing part formed to be curved at the radial outer side toward the surface of the disk D.

The clamping member 200 may be obtained by press-machining an elastic material in a predetermined shape and the position of the clamping member 200 may be clamped on the upper end portion of the screw member 70 while the inner side portion of the clamping member 200 is axially pressed downwardly by a portion extending to the radial outer side when the clamping member 200 is jointed with the screw member 70.

In this case, the pressing part formed at the radial outer side of the clamping member 200 is pressure-welded to the surface of the disk D while being elastically deformed to clamp the disk D between the clamping member 200 and the flange part 128 while forming the pressing point P to the disk D along a predetermined radius of circular arc.

Hereinafter, a detailed configuration of the apparatus for clamping a disk according to the exemplary embodiment will be described with reference to FIGS. 3 and 4. In the motor assembly according to the exemplary embodiment, the apparatus for clamping a disk may be configured of the flange part 128 supporting the disk D and the clamping member 200 pressing the surface of the disk D.

As shown in FIG. 3, the apparatus for clamping a disk according to the exemplary embodiment is considered to be a case in which the pressing point P1 of the clamping member 200 to the disk D is formed outwardly of the radial central portion C of the flange part 128.

According to the exemplary embodiment, as the disk mounting surface of the flange part 128 is toward the radial outer side, the flange part 128 may be formed to be included upwardly in the axial direction and may be formed to have an inclination angle ($\theta$1) with respect to a horizontal surface.

The inclination angle $\theta$1 is formed to be in a range in which the warpage of the disk D is tolerable to the pressure applied to the disk D by the clamping member 200 at the pressing point P1.

As in the present exemplary embodiment, when the pressing point P1 is formed outwardly of the radial central portion C of the flange part 128, values measuring the warpage variations of the disk D depending on the inclination angle $\theta$1 of the flange part 128 are described in the following Table 1.

TABLE 1

| Inclination of flange part ($\mu$m) | Warpage of Disk ($\mu$m) |
|---|---|
| −0.9 | −20.8 |
| −0.6 | −19.7 |
| 0 | −16.9 |
| 0.5 | 0.3 |
| 1.1 | 6.5 |
| 1.5 | 9.5 |
| 1.8 | 21.8 |

When the disk is mounted in the spindle motor, the warpage variations of the disk may be in the range of ±10 $\mu$m. Referring to FIG. 4 and the above Table 1, when the pressure point P1 is formed outward of the central portion C as in the present exemplary embodiment, the inclination of the disk mounting surface of the flange part 128 may exceed 0 $\mu$m and be less than 1.5 $\mu$m. The inclination angle $\theta$1 of the flange part 128 may be 0<$\theta$1≦0.0015 (rad) (where, 1 mm≈1 rad).

If the inclination is 0 $\mu$m or less or exceeds 1.5 $\mu$m, it can be appreciated that the absolute value of the warpage variation of the disk is 10 $\mu$m. Referring to the above Table 1, if the inclination is 0 $\mu$m, it can be appreciated that the warpage of the disk is axially deformed downwardly by −16.9 $\mu$m and if the inclination is 1.8 $\mu$m, the warpage of the disk is axially deformed upwardly by 21.8 $\mu$m.

As such, in the case of the present exemplary embodiment, if the inclination angle $\theta$1 is 0<$\theta$1≦0.0015 (rad), the warpage due to the pressing part of the clamping member 200 of the disk D inserted into the outer peripheral surface of the rotor case and mounted on the disk mounting surface of the flange part 128 may be in the range of ±10 $\mu$m.

Figure 5:
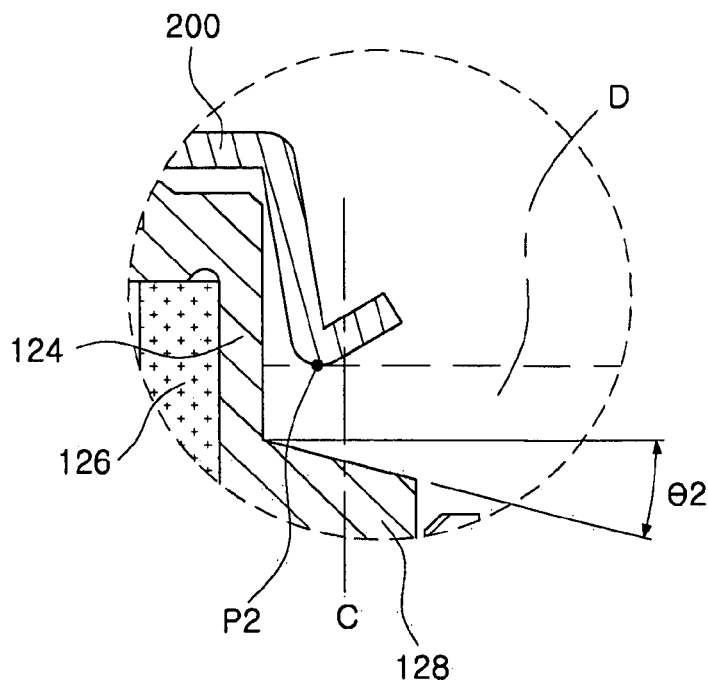
FIG. 5 is an enlarged view of a part corresponding to part A of FIG. 2 in a motor assembly according to another exemplary embodiment of the present invention.
Figure 6:
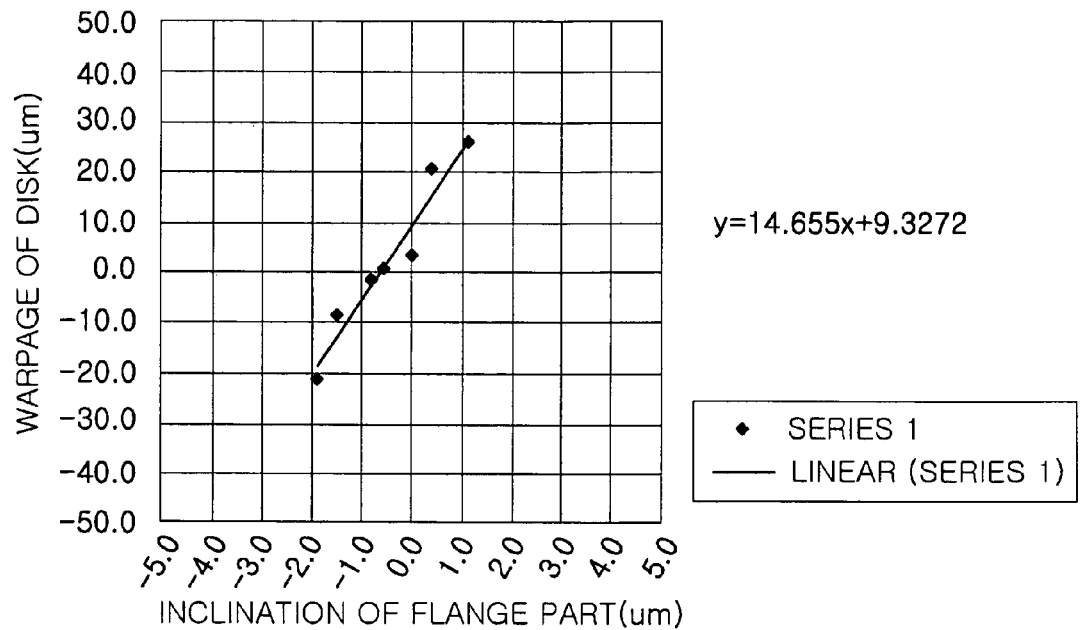
FIG. 6 is a graph measuring the warpage of a disk due to an inclination of a flange part in an apparatus for clamping a disk according to another exemplary embodiment of the present invention.

FIG. 5 is an enlarged view of a part corresponding to part A of FIG. 2 in a motor assembly according to another exemplary embodiment of the present invention and FIG. 6 is a graph measuring warpage of a disk due to an inclination of a flange part in an apparatus for clamping a disk according to an exemplary embodiment of the present invention.

In the motor assembly according to an exemplary embodiment of the present invention shown in FIGS. 5 and 6, a modified example of the apparatus for clamping a disk is shown. Other components are substantially the same as the motor assembly according to the exemplary embodiment of the present invention shown in FIGS. 1 to 4 and therefore, a detailed description of the components thereof will be omitted. Hereinafter, only the differences therebetween will be described.

Referring to FIG. 5, in the motor assembly according to the exemplary embodiment of the present invention, the apparatus for clamping a disk may be configured of the flange part 128 supporting the disk D and the clamping member 200 pressing the surface of the disk D.

As shown in FIG. 5, the apparatus for clamping a disk according to the present exemplary embodiment is considered to be a case in which the pressing point P2 of the clamping member 200 to the disk D is formed inward of the radial central portion C of the flange part 128.

According to the exemplary embodiment, as the disk mounting surface of the flange part 128 is toward the radial outer side, the flange part 128 may be formed to be included downwardly in the axial direction and may be formed to have an inclination angle (θ2) with respect to a horizontal surface.

The inclination angle θ2 may be formed to be in a range in which the warpage of the disk D is tolerable to the pressure applied to the disk D by the clamping member 200 at the pressing point P2, for example, the range in which the warpage of the disk is ±10 μm.

As in the present exemplary embodiment, when the pressing point P2 is formed inwardly of the radial central portion C of the flange part 128, the values measuring the warpage variations of the disk D depending on the inclination angle θ2 of the flange part 128 are described in the following Table 2.

TABLE 2

| Inclination of flange part (μm) | Warpage of disk (μm) |
| --- | --- |
| −1.9 | −21.1 |
| −1.5 | −8.7 |
| −0.8 | −1.8 |
| −0.6 | 0.4 |
| 0 | 3.1 |
| 0.4 | 20.3 |
| 1.1 | 25.5 |

When the disk D is mounted in the spindle motor, the warpage variations of the disk may be in the range of ±10 μm. Referring to FIG. 6 and the above Table 2, when the pressure point P2 is formed inward of the central portion C as in the present exemplary embodiment, the inclination of the disk mounting surface of the flange part 128 may be −1.5 μm or more and 0 μm or less. That is, the inclination angle θ2 of the flange part 128 may be −0.0015≦θ2≦0 (rad) (where, 1 mm≈1 rad).

If the inclination is less than −1.5 μm or exceeds 0 μm, it can be appreciated that the absolute value of the warpage variation of the disk is 10 μm. Referring to the above Table 2, if the inclination is −1.9 μm, that is, less than −1.5 μm, it can be appreciated that the warpage of the disk is axially deformed downwardly by −21.1 μm and if the inclination is 0.4 μm that is more than 0 μm, the warpage of the disk is axially deformed upwardly by 20.3 μm.

As such, in the case of the present exemplary embodiment, if the inclination angle θ2 is −0.0015≦θ2≦0 (rad), the warpage due to the pressing part of the clamping member 200 of the disk D inserted into the outer peripheral surface of the rotor case and mounted on the disk mounting surface of the flange part 128 may be in the range of ±10 μm.

Figure 7:
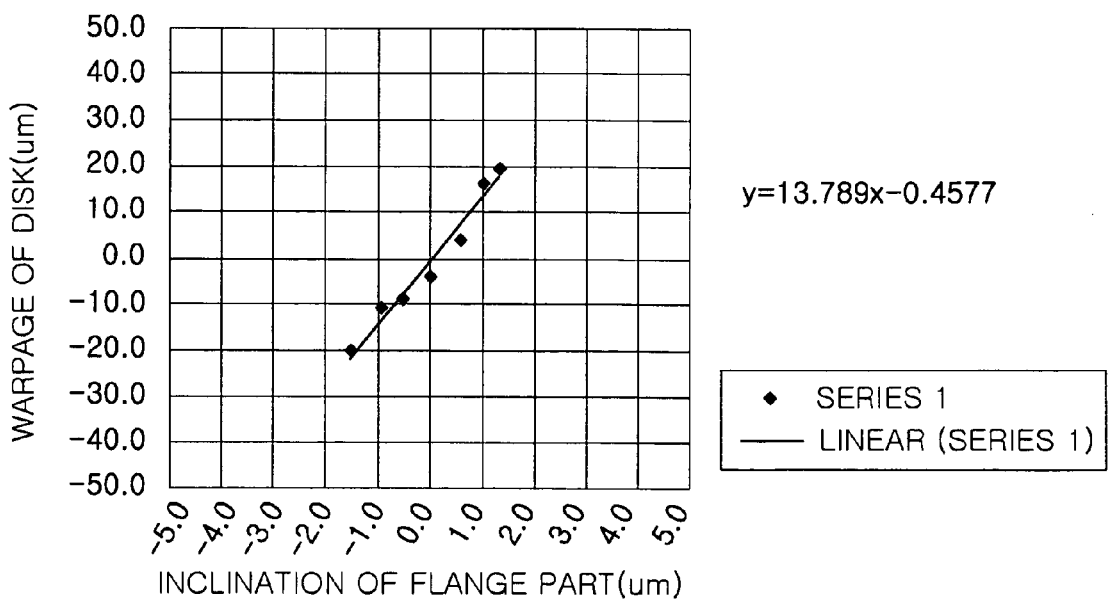
FIG. 7 is a graph measuring the warpage of a disk due to an inclination of a flange part in an apparatus for clamping a disk according to another exemplary embodiment of the present invention.

FIG. 7 is a graph measuring warpage of a disk due to an inclination of a flange part in an apparatus for clamping a disk according to another exemplary embodiment of the present invention.

In the motor assembly according to another exemplary embodiment of the present invention shown in FIG. 7, a modified example of the apparatus for clamping a disk is shown. Other components are substantially the same as the motor assembly according to the exemplary embodiment of the present invention shown in FIGS. 1 to 4 and therefore, a detailed description of the components thereof will be omitted. Hereinafter, only the differences therebetween will be described.

As shown in FIG. 7, the apparatus for clamping a disk according to the present exemplary embodiment is considered to be a case in which the pressing point P of the clamping member 200 to the disk D is formed at the radial central portion C of the flange part 128.

As in the present exemplary embodiment, when a pressing point P3 is formed at the radial central portion C, values measuring the warpage variations of the disk D depending on the inclination angle θ3 of the flange part 128 are described in the following Table 3.

TABLE 3

| Inclination of flange part (μm) | Warpage of disk (μm) |
| --- | --- |
| −1.5 | −19.9 |
| −0.9 | −10.9 |
| −0.6 | −8.9 |
| 0 | −4.1 |
| 0.6 | 4.1 |
| 1.0 | 16.3 |
| 1.3 | 19.8 |

According to the present exemplary embodiment, an inclination angle θ3 with respect to the horizontal surface of the disk mounting surface of the flange part 128 may be formed to be in a range in which the warpage of the disk D is tolerable to the pressure applied to the disk D by the clamping member 200 at the pressing point P3, for example, the range in which the warpage of the disk is ±10 μm.

Referring to FIG. 7 and the above Table 3, as in the present exemplary embodiment, when the pressing point P3 is formed at the central portion C, the inclination of the disk mounting surface of the flange part 128 may be −0.6 μm or more and 0.6 μm or less. That is, the inclination angle θ3 of the flange part 128 may be −0.0006≦θ3≦0.0006 (rad) (where, 1 mm≈1 rad).

If the inclination is less than −0.6 μm or more than 0.6 μm, it can be appreciated that the absolute value of the disk warpage variations is 10 μm or more. Referring to the above Table 3, if the inclination is −0.9 μm, that is, less than −0.6 μm, it can be appreciated that the warpage of the disk is −10.9 μm, which is axially deformed downwardly by −10 μm and if the inclination is 1.0 μm that is more than 0.6 μm, it can be appreciated that the warpage of the disk is 16.3 μm, which is axially deformed upwardly by 10 μm or more.

As such, in the case of the present exemplary embodiment, if the inclination angle θ3 is −0.0006≦θ3≦0.0006 (rad), the warpage due to the pressing part of the clamping member 200 of the disk D inserted into the outer peripheral surface of the rotor case and mounted on the disk mounting surface of the flange part 128 may be in the range of ±10 μm.

As set forth above, the apparatus for clamping a disk and the motor assembly having the same minimizes the warpage of the disk at the time of mounting the disk, thereby making it possible to improve the rotation precision.

While the present invention has been shown and described in connection with the exemplary embodiments, it will be apparent to those skilled in the art that modifications and variations can be made without departing from the spirit and scope of the invention as defined by the appended claims.

What is claimed is:

1. An apparatus for clamping a disk, comprising:
a rotor case jointed with an outer peripheral surface of a shaft and rotating together with the shaft;
a flange part including a disk mounting surface formed at a radial outer side of the rotor case and formed to be inclined as the disk mounting surface is toward the radial outer side; and
a clamping member pressing and clamping the disk to the rotor case,
wherein an inclination of the disk mounting surface of the flange part is changed depending on the position of the pressing point to the disk of the clamping member, and
wherein the disk mounting surface of the flange part is formed to be inclined upwardly in an axial direction when the pressing point is outward of the radial center of the flange part and is formed to be inclined downwardly in the axial direction when the pressing point is inward of the radial center of the flange part.

2. An apparatus for clamping a disk, comprising:
a rotor case jointed with an outer peripheral surface of a shaft and rotating together with the shaft;
a flange part including a disk mounting surface formed at a radial outer side of the rotor case and formed to be inclined as the disk mounting surface is toward the radial outer side; and
a clamping member pressing and clamping the disk to the rotor case,
wherein an inclination of the disk mounting surface of the flange part is changed depending on the position of the pressing point to the disk of the clamping member,
wherein the inclination angle $\theta$ of the disk mounting surface of the flange part from the horizontal surface is $0<\theta\leq0.0015$ (rad) when the pressing point to the disk of the clamping member is outward of the radial center of the flange part, and
the inclination angle $\theta$ is $-0.0015\leq\theta<0$ (rad) when the pressing point is inward of the radial center of the flange part.

3. The apparatus for clamping a disk of claim 2, wherein the inclination angle $\theta$ of the disk mounting surface is $0<|\theta|\leq0.0006$ (rad) when the pressing point is the radial center of the flange part.

4. An apparatus for clamping a disk, comprising:
a rotor case jointed with an outer peripheral surface of a shaft and rotating together with the shaft;
a flange part including a disk mounting surface formed at a radial outer side of the rotor case and formed to be inclined as the disk mounting surface is toward the radial outer side; and
a clamping member pressing and clamping the disk to the rotor case,
wherein an inclination of the disk mounting surface of the flange part is changed depending on the position of the pressing point to the disk of the clamping member, and
wherein the disk mounting surface of the flange part is formed to be inclined so that the warpage of the disk is in the range of $\pm10$ μm when the disk mounting surface is seated with the disk.

5. An apparatus for clamping a disk, comprising:
a rotor case jointed with an outer peripheral surface of a shaft and rotating together with the shaft;
a flange part including a disk mounting surface formed at a radial outer side of the rotor case and formed to be inclined as the disk mounting surface is toward the radial outer side; and
a clamping member pressing and clamping the disk to the rotor case,
wherein an inclination angle $\theta$ of the disk mounting surface of the flange part from a horizontal surface is formed in the range of $0<|\theta|\leq0.0015$ (rad), depending on the position of the pressing point to the disk of the clamping member.

6. The apparatus for clamping a disk of claim 5, wherein the inclination angle $\theta$ of the disk mounting surface is $0<\theta\leq0.0015$ (rad) when the pressing point to the disk of the clamping member is outward of the radial center of the flange part, and
the inclination angle $\theta$ is $-0.0015\leq\theta<0$ (rad) when the pressing point is inward of the radial center of the flange part.

7. The apparatus for clamping a disk of claim 6, wherein the inclination angle $\theta$ of the disk mounting surface is $0<|\theta|\leq0.0006$ (rad) when the pressing point is the radial center of the flange part.

8. A motor assembly, comprising:
a rotor including a rotor case jointed with an outer peripheral surface of a shaft and rotating together with the shaft; a flange part including a disk mounting surface formed at a radial outer side of the rotor case and formed to be inclined as the disk mounting surface is toward the radial outer side; and a magnet mounted on the inner side of the rotor case;
a bearing member rotatably supporting the shaft;
a stator jointed with the outer peripheral surface of the bearing member and including a core wound with a winding coil generating a rotation driving force by electromagnetic interaction with the magnet; and
a clamping member pressing and clamping the disk to the rotor case,
wherein the inclination angle $\theta$ of the disk mounting surface of the flange part from the horizontal surface is formed in the range of $0<|\theta|\leq0.0015$ (rad), depending on the position of the pressing point to the disk of the clamping member.

9. The motor assembly of claim 8, wherein the inclination angle $\theta$ of the disk mounting surface is $0<\theta\leq0.0015$ (rad) when the pressing point to the disk of the clamping member is outward of the radial center of the flange part, and
the inclination angle $\theta$ is $-0.0015\leq\theta<0$ (rad) when the pressing point is inward of the radial center of the flange part.

10. The motor assembly of claim 9, wherein the inclination angle $\theta$ of the disk mounting surface is $0<|\theta|\leq0.0006$ (rad) when the pressing point is the radial center of the flange part.

11. The motor assembly of claim 8, wherein the disk mounting surface of the flange part is formed to be inclined so that the warpage of the disk is in the range of $\pm10$ μm when the disk is seated on the disk mounting surface.

* * * * *